US006327774B1

(12) United States Patent
Cheon et al.

(10) Patent No.: US 6,327,774 B1
(45) Date of Patent: Dec. 11, 2001

(54) ASSEMBLING MACHINE FOR NEGATIVE ELECTRODE PLATE FOR NI-MH BATTERIES AND ASSEMBLY PROCESS THEREOF

(75) Inventors: San Cheon, Yonin; Ho-Yeon Kim, Pyungtaek; Hi-Un Won, Asan, all of (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/473,800

(22) Filed: Dec. 28, 1999

(30) Foreign Application Priority Data

Jul. 1, 1999 (KR) .................................................. 99-26356

(51) Int. Cl.$^7$ .............................. H01M 6/00; B23P 19/00
(52) U.S. Cl. ..................................... 29/730; 29/731; 29/2; 29/623.1
(58) Field of Search ................................ 29/623.1, 623.3, 29/623.4, 730, 731, 729, 2; 429/94, 161, 211; 198/456; 414/788

(56) References Cited

U.S. PATENT DOCUMENTS

| 4,509,252 | * | 4/1985 | Sabatino et al. ............... 29/623.1 |
| 4,510,682 | * | 4/1985 | Sabatino et al. ............... 29/623.1 |
| 4,583,286 | * | 4/1986 | Schaumburg et al. ............ 29/730 |
| 5,045,086 | * | 9/1991 | Juergens ...................... 29/623.1 |
| 5,637,416 | * | 6/1997 | Yoshii et al. .................. 429/94 |

* cited by examiner

Primary Examiner—Gabrielle Brouillette
Assistant Examiner—R. Alejandro
(74) Attorney, Agent, or Firm—Christie, Parker & Hale, LLP

(57) ABSTRACT

The present invention relates to an assembling machine for Ni-MH batteries and an assembly process thereof, more particularly, to an automated assembling machine for a negative electrode plate Ni-MH battery wherein the negative electrode plate for Ni-MH batteries can be made through an automated on-line production process so that cost, time, and reject rate of production thereof can be substantially reduced, and hence production efficiency can be maximized. The present invention to accomplish the above purpose consists of the above described assembling machine for the negative electrode plate consists of an electrode plate feeding unit supplying a source material of the negative electrode plate from an electrode plate roll, a first blanking press cutting the source material of the negative electrode plate into a rectangular negative electrode plate unit, an active material removing unit removing an active material comprising the surface of the negative electrode plate striking the active material removal area of the negative electrode plate, a tab feeding unit supplying a tab strip from a tab strip roll, a tact welding unit that temporarily welds an edge area of a tab strip that is supplied from the tab feeding unit to upper and lower faces of the active material removal area of the negative electrode plate, a cutting unit that cuts rectangular tabs of a predetermined size from the temporarily welded tab strip, a finish welding unit that fully welds the temporarily welded tab, a second blanking press unit that finally cuts with a desired shape the negative electrode plate that is fully welded with the tab.

12 Claims, 28 Drawing Sheets

ASSEMBLING MACHINE FOR NEGATIVE ELECTRODE PLATE FOR NI-MH BATTERIES AND ASSEMBLY PROCESS THEREOF

BACKGROUND OF THE INVENTION (a) Field of the Invention

The present invention relates to an assembling machine for Ni-MH batteries and an assembly process thereof, more particularly, to an automated assembling machine for a negative electrode plate NI-MH battery which is a secondary battery and the assembly process using the assembling machine thereof.

(b) Description of the Related Art

With the rapid increase in the spread of portable devices such as personal communication systems and notebook computers, there has bee a demand for the development of secondary batteries that are compact, lightweight, and have high energy density. The introduction of environmentally friendly zero-emission electric vehicles have also resulted in the further demand for the development of secondary batteries as power sources.

Batteries generally convert chemical energy into electrical energy by the electric potential difference between metals, and can be classified as primary (nonrechargeable) batteries, secondary (rechargeable) batteries, and special batteries such as solar cells. Primary batteries can be further classified as manganic cell, alkaline cell, mercuric oxide cell, and silver oxide cell batteries depending on the type of electrode, while secondary batteries can be classified as Ni-MH batteries using metal-hydroxide as the electrode, sealed nickel-cadnium batteries, lithium-metal batteries, lithium-ion batteries, and lithium-polymer batteries.

While primary batteries have disadvantages such as short life, low capacity, and nonrechargeability, secondary batteries have excellent performance characteristics for electric vehicles due to their high capacity and long life. Ni type batteries are widely used as secondary batteries because they have proven to have good recycling characteristics and environmental performance.

However, the above Ni type batteries, especially Ni-MH batteries have the disadvantage of low production efficiency that results from a large number of operational steps and a long lead time due to manual assembly operations.

FIG. 1 shows the production process for the negative electrode plate for Ni-MH batteries with previously employed manual assembly operations consisting of seven operational steps.

As indicated in FIG. 1, a line operator pulls by hand a predetermined length negative electrode plate 103 from a negative electrode plate roll 101 and cuts it with a hand cutter. After the cut negative electrode plate 103 is transferred to a rubber table, a line operator marks a boundary of an active material removal area 105 using an engraver, removes the active material of an active material removal area 105 using a manual hammer, and cuts a predetermined length of Ni foil for a tab 107 using a cut-off machine. The corner folded with two Ni foil pieces is weld using a welding machine in a process where a pair of welded Ni foil pieces 107 are positioned at the active material removal area 105 of the negative electrode plate 103 and four corner points of the folded area are temporarily welded using the welding machine. The temporarily weld electrode plate 103-1 is fully welded using a direct current resistance welding machine, and a final electrode plate 103-2 is then blanked using a blanking press.

However, as the above assembly process for a negative electrode plate for Ni-MH batteries by previously employed manual assembly operations is dependent on manual operations using manual tools, the total manufacturing expense and product reject rate is high due to a large number of assembly operational steps.

SUMMARY OF THE INVENTION

The present invention made to solve the above problems provides the assembling machine for a negative electrode plate and an assembly process thereof, wherein the negative electrode plate for Ni-MH batteries can be made through an automated through production process so that cost, time, and reject rate of production can be substantially reduced, and hence production efficiency can be maximized.

The above described assembling machine for the negative electrode plate consists of an electrode plate feeding unit supplying a source material of the negative electrode plate from an electrode plate roll, a first blanking press cutting the source material of the negative electrode plate into a rectangular negative electrode plate unit, an active material removing unit removing an active material of the surface of the negative electrode plate by striking the active material removal area of the negative electrode plate, a tab feeding unit supplying a tab strip from a tab strip roll, a tact welding unit that temporarily welds an edge area of a tab strip that is supplied from the tab feeding unit to upper and lower faces of the active material removal area of the negative electrode plate, a cutting unit that cuts rectangular tabs of a predetermined size from the temporarily welded tab strip, a finish welding unit that fully welds the temporarily welded tab, a second blanking press unit that finally cuts with a desired shape the negative electrode plate that is fully welded with the tab.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

In the following detailed description, only the preferred embodiment of the invention has been shown and described, simply by way of illustration of the best mode contemplated by the inventor for carrying out the invention. As will be realized, the invention is capable of modification in various respects, all without departing from the invention. Accordingly, the drawings and description are to be regarded as illustrative in nature, and not restrictive.

Figure 1:
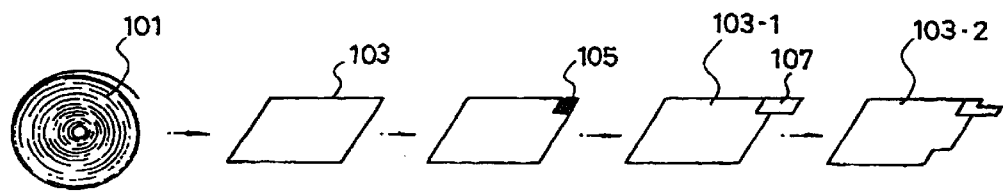
FIG. 1 is an outline diagram illustrating the assembly process for a negative electrode plate for Ni-MH batteries by previously employed manual assembly operations.
Figure 2:
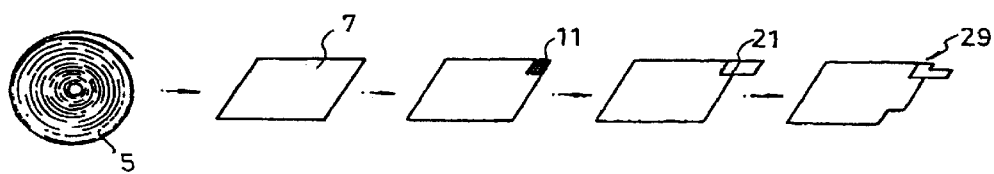
FIG. 2 is an outline diagram illustrating the assembly process for a negative electrode plate for Ni-MH batteries by an assembling machine according to the present invention.

An assembling machine for a negative electrode plate for Ni-MH batteries according to the present invention can assemble and produce a negative electrode plate by a series of processes as shown in FIG. 2 in a manner that is similar to previously employed manual assembly operations. These operations consisted of unwinding a negative electrode plate roll 5, cutting a negative electrode plate 7 to a predetermined length, striking an active material removal area 11 of the negative electrode plate, removing the coated active material from the active material removal area 11, welding a tab 21 on upper and lower faces thereof, and finally blanking it into a desired shape.

Figure 3:
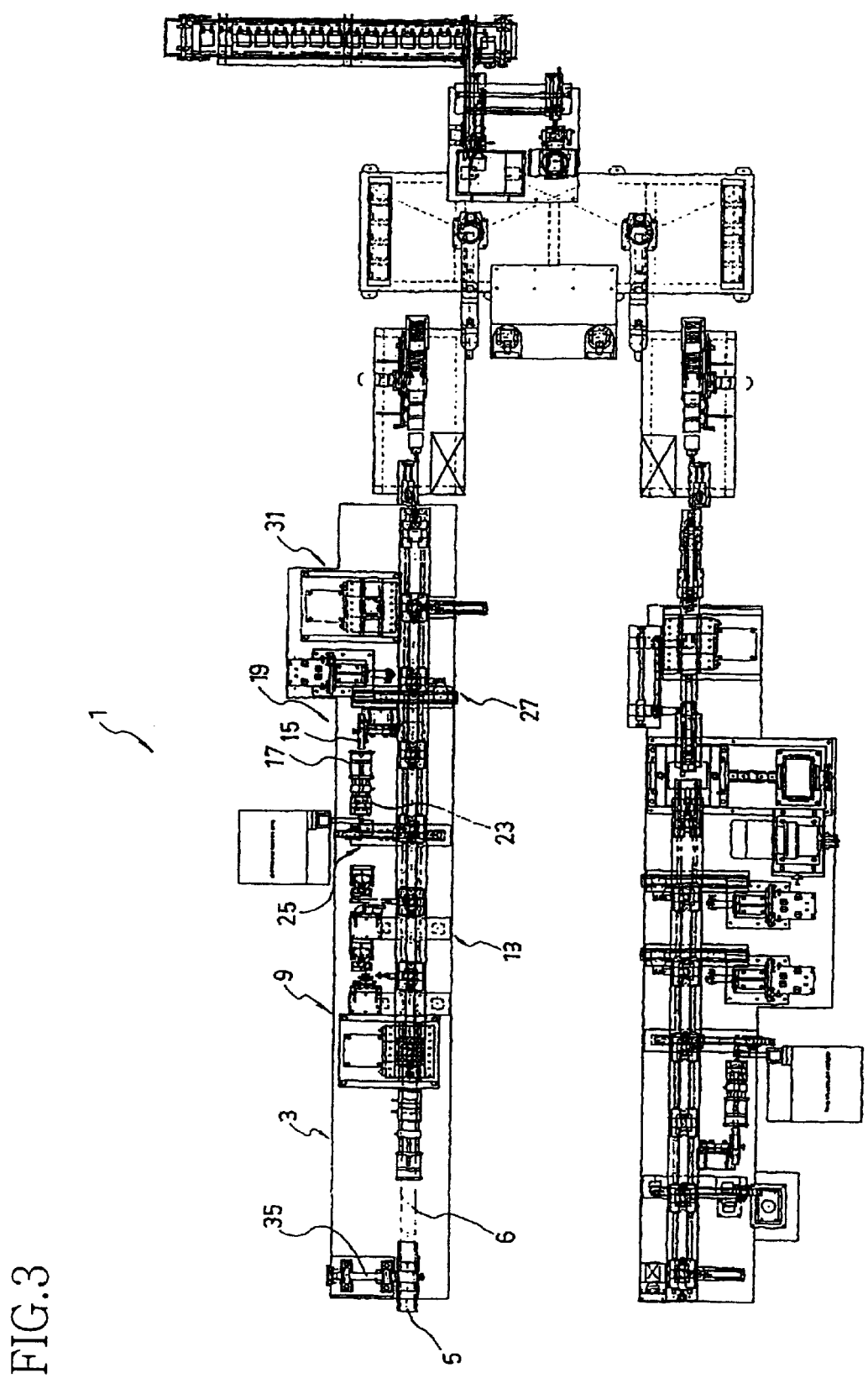
FIG. 3 is an overall plane view of an assembling machine according to the present invention.

A negative electrode plate assembling machine 1 as shown in FIG. 3 consists of many processing units, such as an electrode plate feeding unit 3, a first blanking press unit 9, an active material removing unit 13, a tab feeding unit 19, a tact welding unit 25, a cutting unit 23, a finish welding unit 27, and a second blanking press unit 31.

Figure 4A:
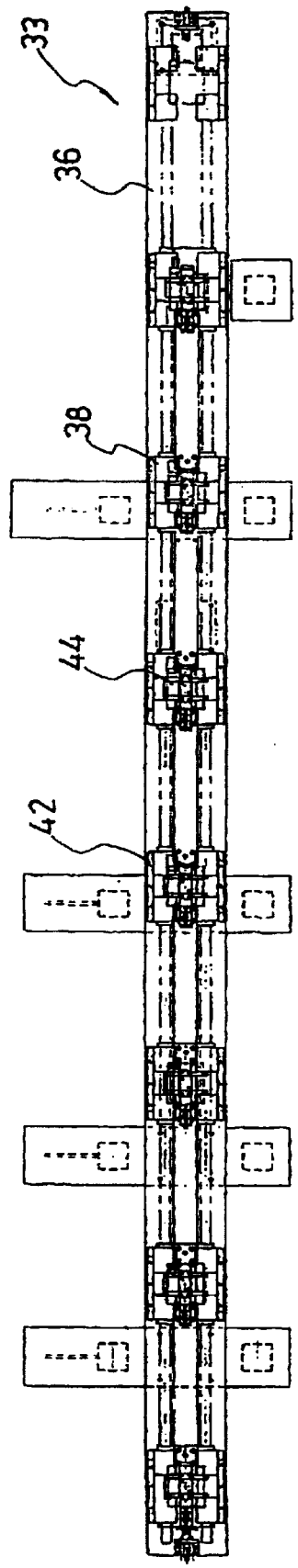
FIGS. 4A to 4C respectively provide a plane view, a front view, and a side view illustrating an under shuttle of an assembling machine as shown in FIG. 3.
Figure 4B:
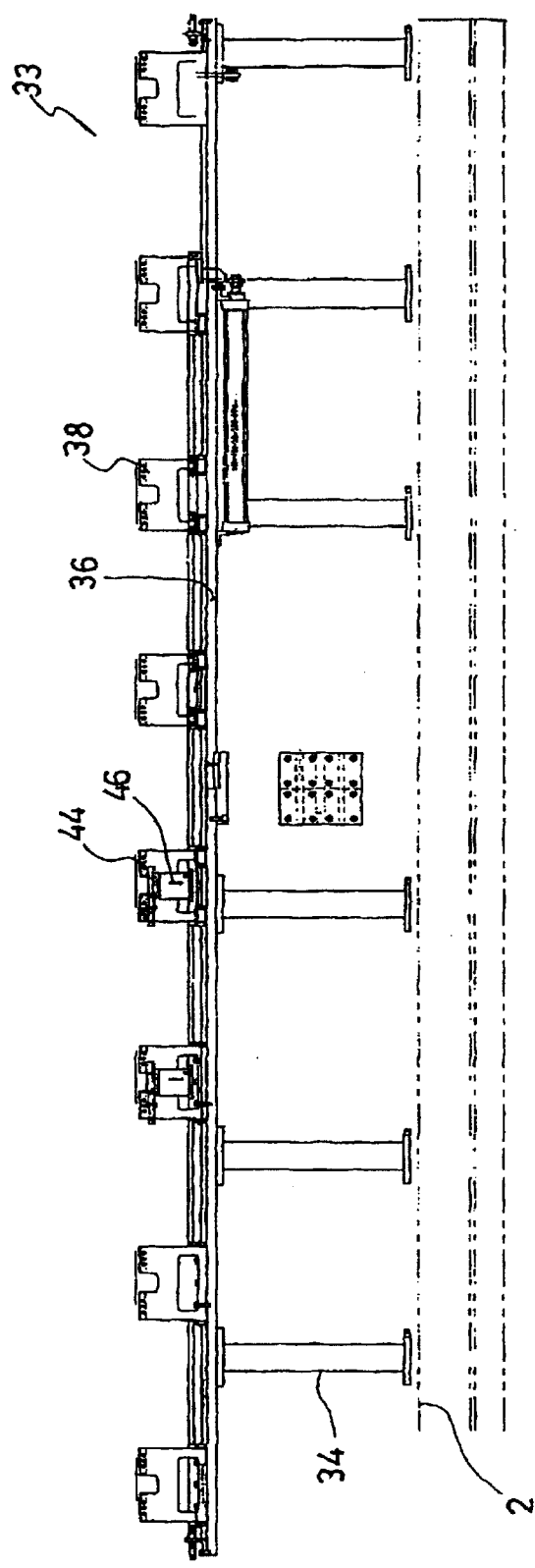
Figure 4C:
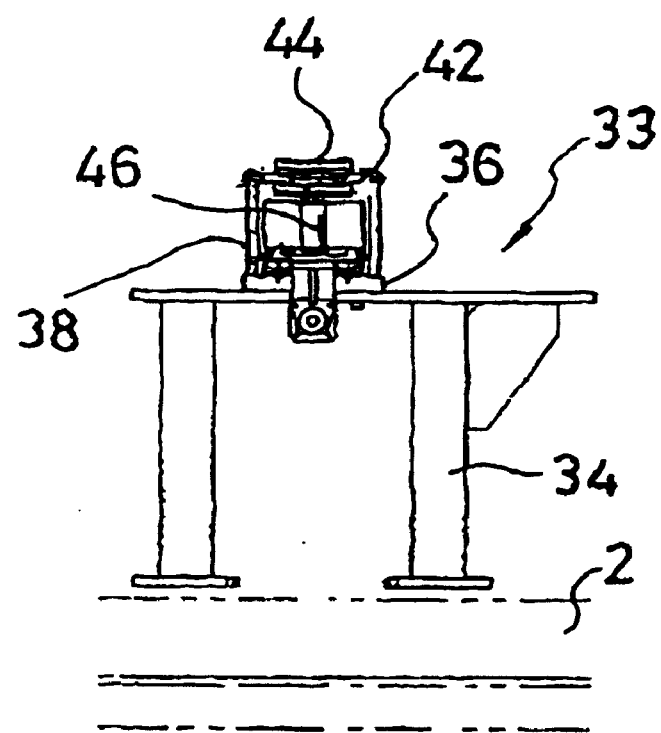

For a series of continuous processes through the above composing units 9, 13, 23, 25, 27, and 31, an under shuttle 33 as shown in FIGS. 4A to 4C transfers a series of negative electrode plates 7 between each unit 9, 13, 23, 25, 27, and 31. The under shuttle 33 is supported by a vertical frame 34 disposed at a base frame 2. The same consists of a base plate 36 comprising a base, a slide plate 38 moving between each unit, a fixed seat 42 attached above the slide plate for locating the negative electrode plate 7, a moving seat 44 that moves toward two opposite ends of the slide plate 38 through an opening at a center portion of the fixed seat 42, and a guide cylinder 46 causing a reciprocation of the moving seat 44.

Figure 5A:
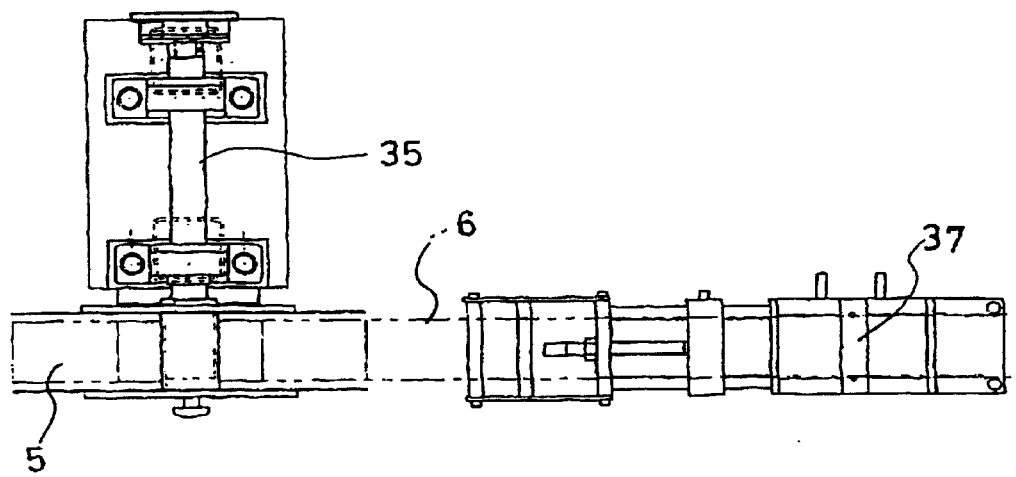
FIGS. 5A and 5B respectively provide a plane view and a front view illustrating a negative electrode feeding unit of an assembling machine as shown in FIG. 3.
Figure 5B:
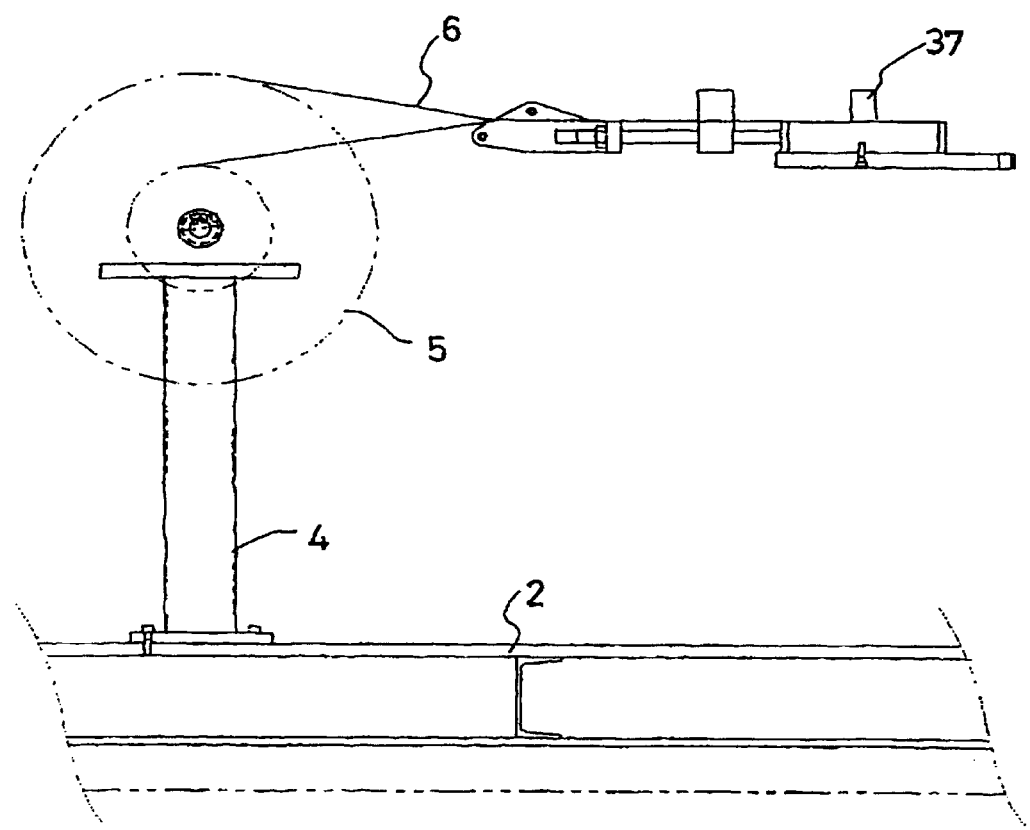

The above electrode plate feeding unit 3 for supplying the source material of the negative electrode plate 6 to the first blanking press unit 9 consists of a rotating electrode plate roll 5 that is interposed between a shaft 35 attached on a supporting column 4 disposed at a base frame 2 as shown in FIGS. 5A and 5B and a sliding air feeder 37 that is aligned with the electrode plate roll 5, transferring the negative electrode plate 6 coiled at the electrode plate roll 5 by sliding.

Figure 6A:
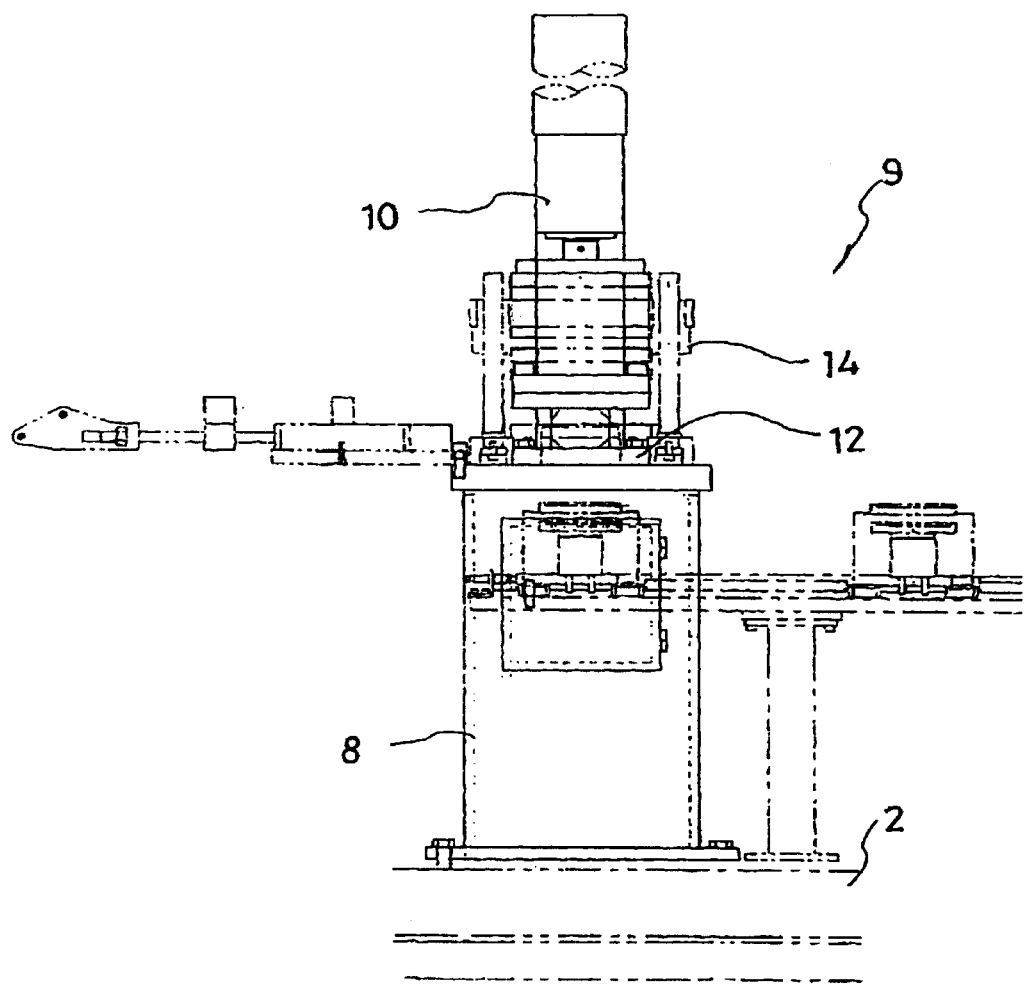
FIGS. 6A to 6C respectively provide a front view, a plane view, and a side view illustrating a first blanking press unit of an assembling machine as shown in FIG. 3.
Figure 6B:
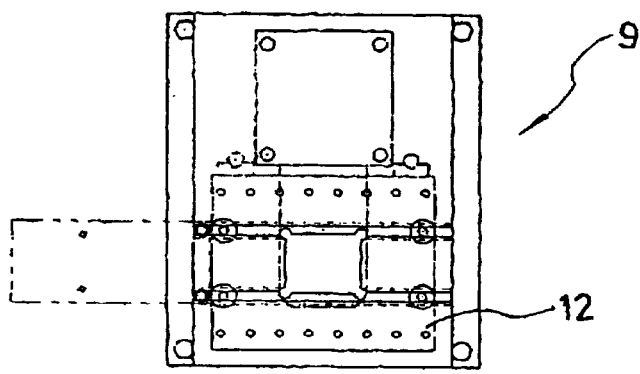
Figure 6C:
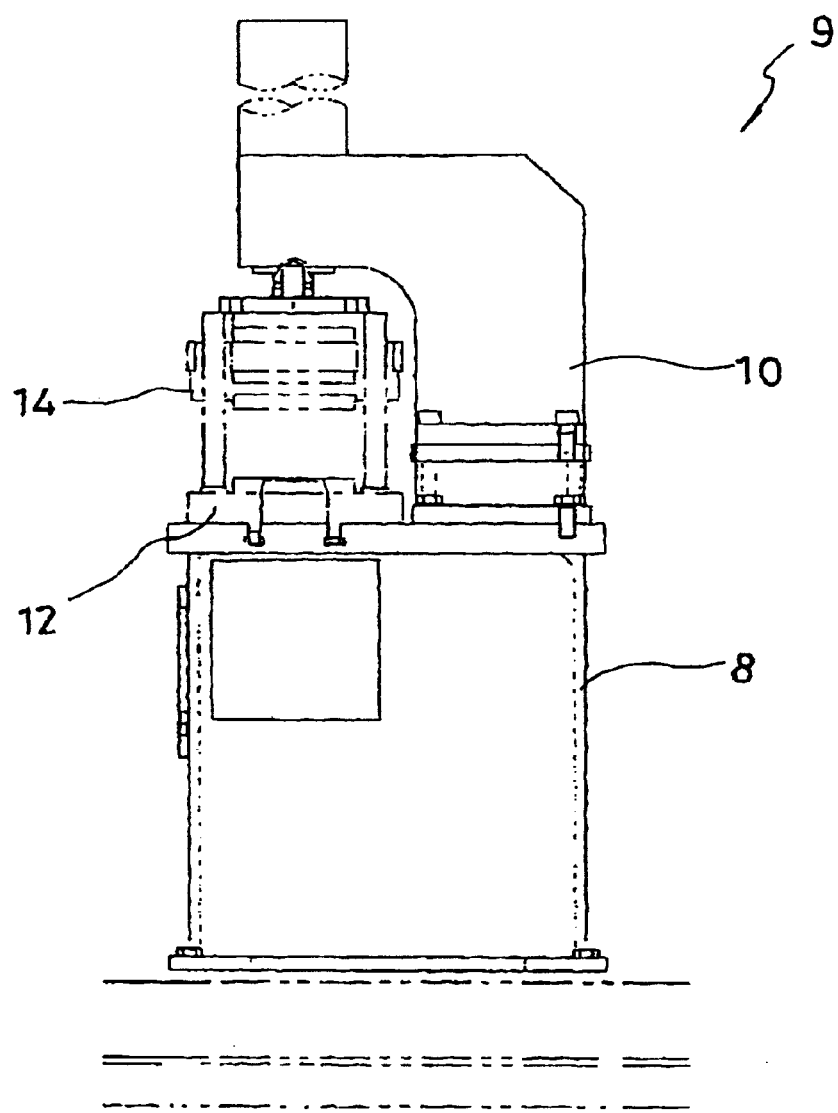

The first blanking press unit 9 as shown in FIGS. 6A to 6C for forming the rectangular negative electrode plate unit 7 by cutting the supplied electrode plate 6 from the electrode plate feeding unit 3, is supported by a frame 8 attached on the base frame 2 and consists of a main body of press 10 causing the blanking force, a mold base 12 comprising the bottom die of press, and a blanking punch 14 comprising the upper die of press.

Figure 7A:
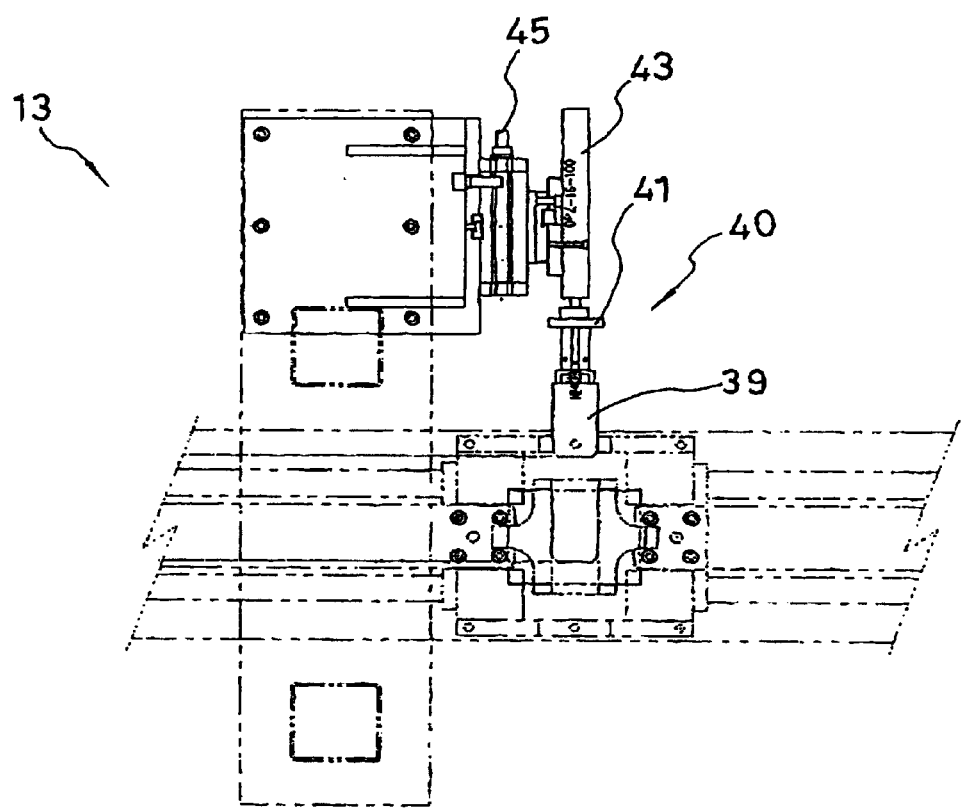
FIGS. 7A to 7C respectively provide a plane view, a side view, and a front view illustrating a holding portion of an active material removing unit of an assembling machine as shown in FIG. 3.
Figure 7B:
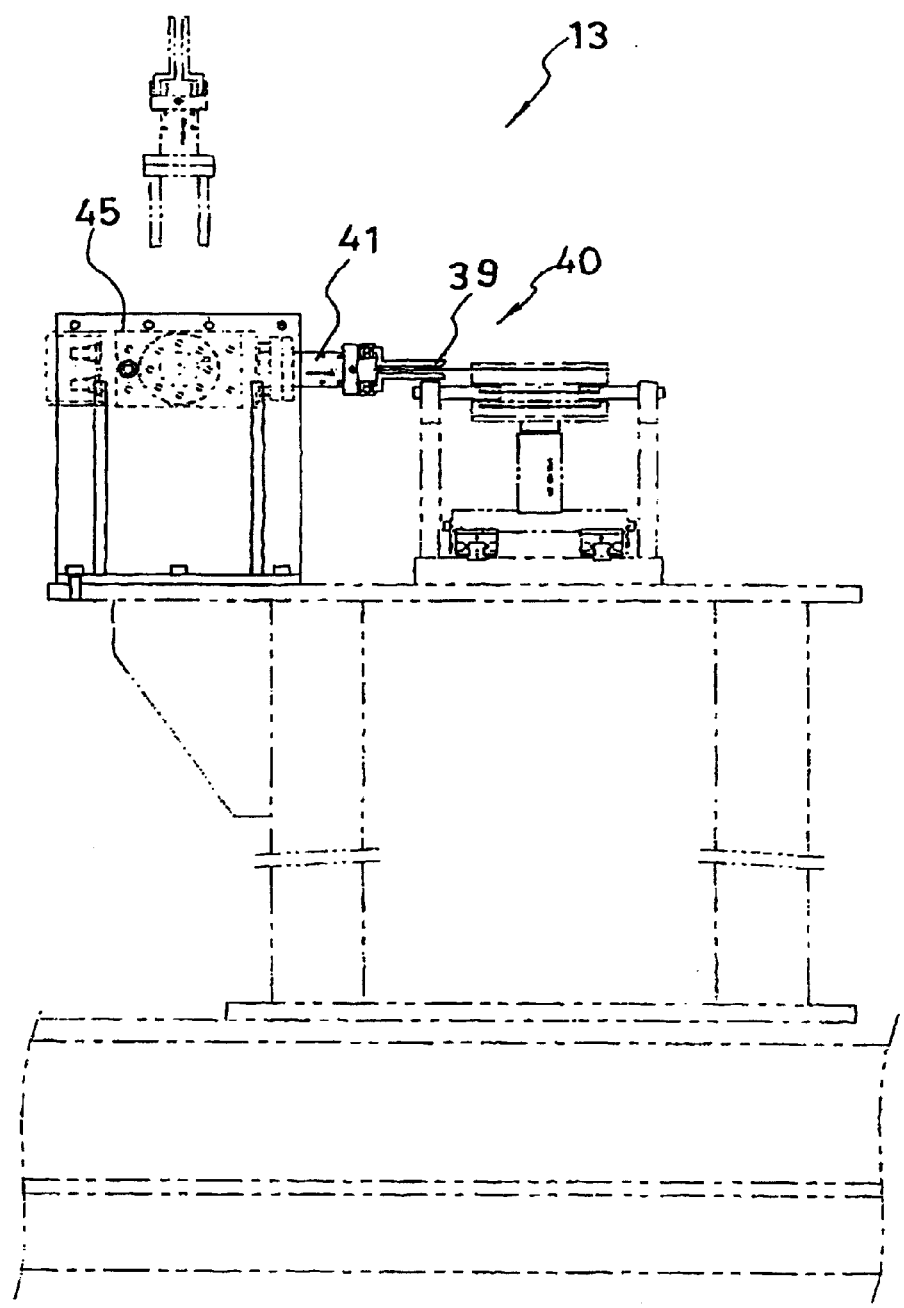
Figure 7C:
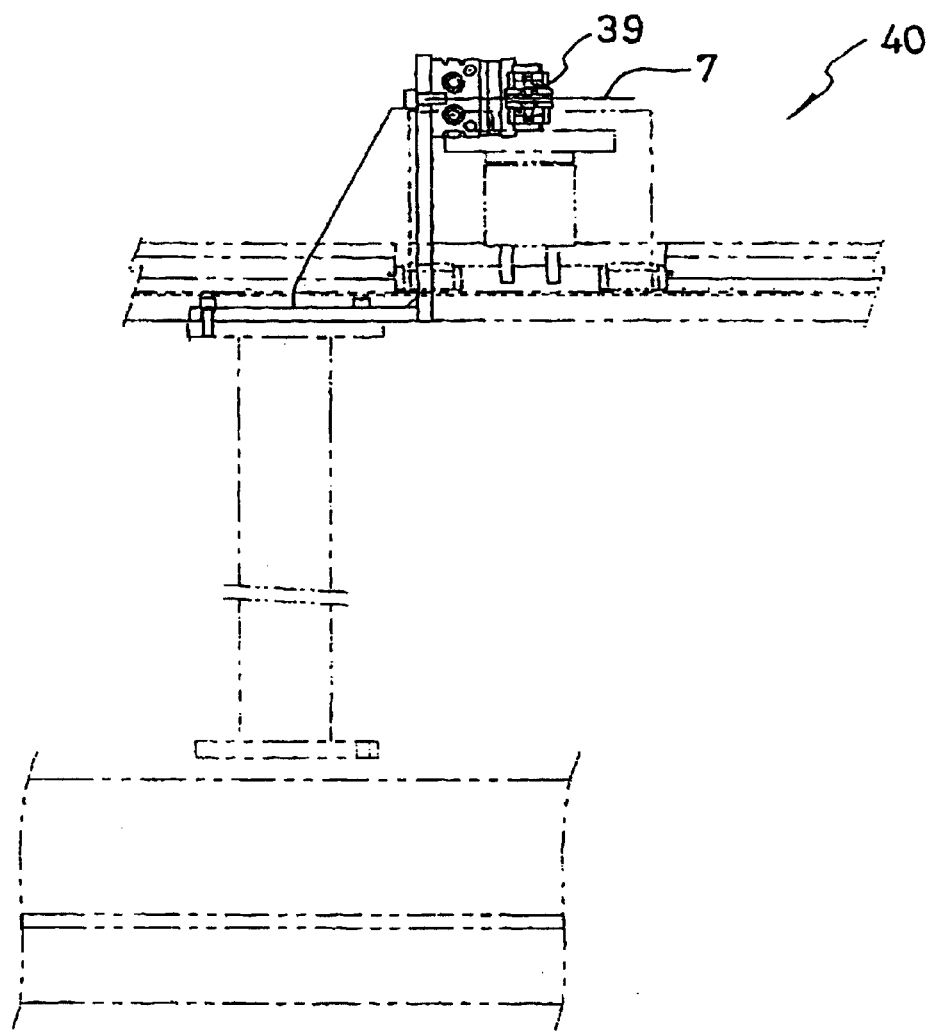
Figure 8A:
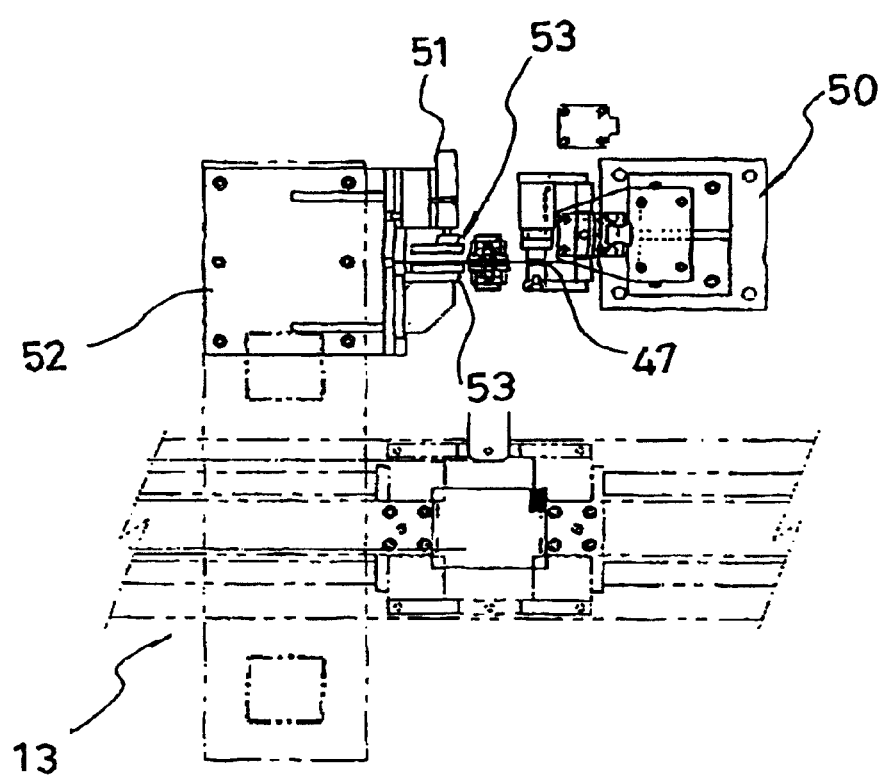
FIGS. 8A and 8B respectively provide a plane view and a side view illustrating a striking portion of an active material removing unit of an assembling machine as shown in FIG. 3.
Figure 8B:
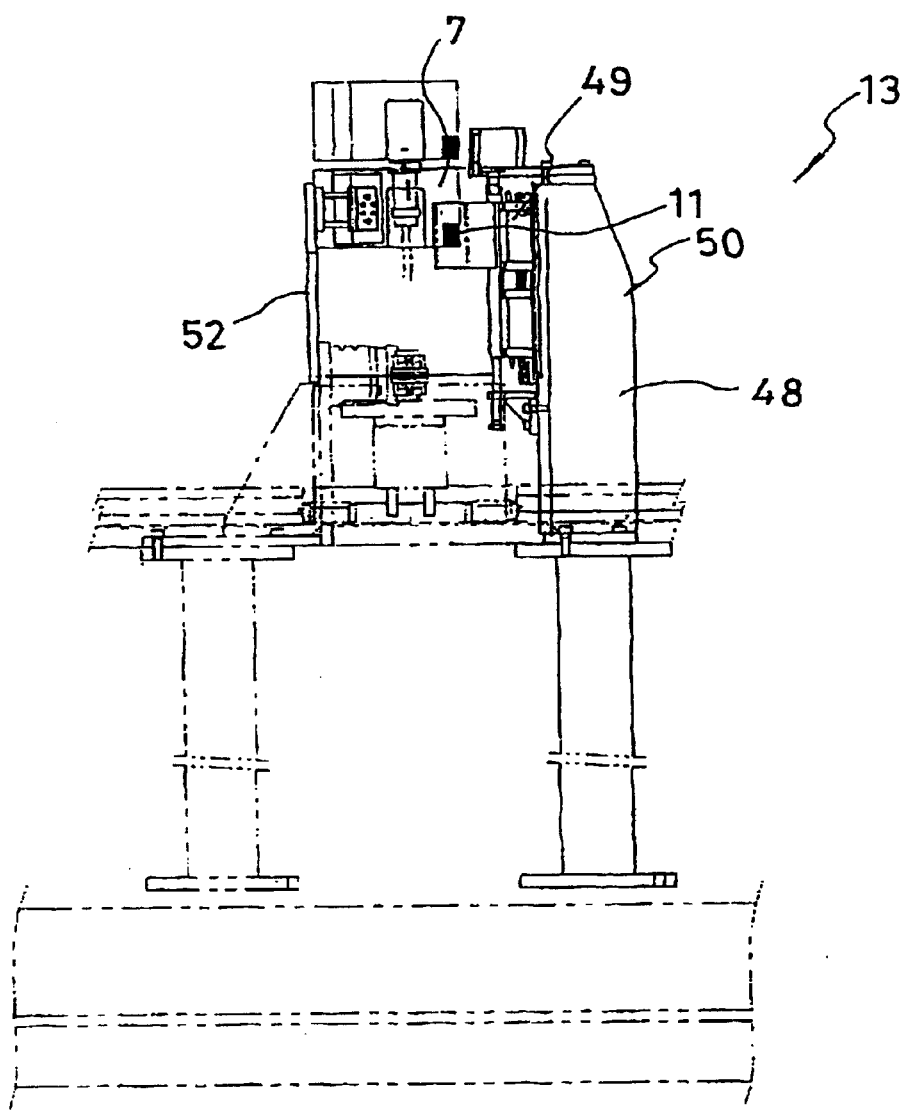

The active material removing unit 13 consists of a negative electrode plate holding portion 40 as shown in FIGS. 7A to 7C and a striking portion 50 as shown in FIGS. 8A and 8B so that active material removing unit 13 removes the active material comprising the surface of the negative electrode plate 7 by striking an active material removal area of the negative electrode plate 7 blanked at the first blanking press unit 9.

The holding portion 40 of the negative electrode plate consists of a finger portion 39, a twin cylinder 43, and a rotary cylinder 45. The striking portion 50 consists of a vibration hammer 47 and a stopper 53. At this point the finder portion 39 of the holding portion 40 holds the negative electrode plate transferred from the first blanking press unit 9 through the under shuttle 33, while the twin cylinder 43 that is connected to a hand portion 41 through the finger portion 39 axially slides the finger portion 39 holding the negative electrode plate 7. The rotary cylinder 45 attached with the twin cylinder 43 rotates the hand portion 41 and the finger portion 39 upward with a right angle rotation. The vibration hammer 47 as shown in FIGS. 8A and 8B is disposed at the upper part of a vertically formed bracket 48. This vibration hammer 47 can be reciprocated by a linear motor 49 attached at the bracket 48, and can strike an active material removal area 11 of the loaded negative electrode plate 7 that is lifted to a striking position by the rotation of the finger portion 39. The stopper 53 disposed at the bracket 52 opposite the vibration hammer 47 can support the negative electrode plate 7 by the twin cylinder 51 fixed at the bracket 52.

Figure 9A:
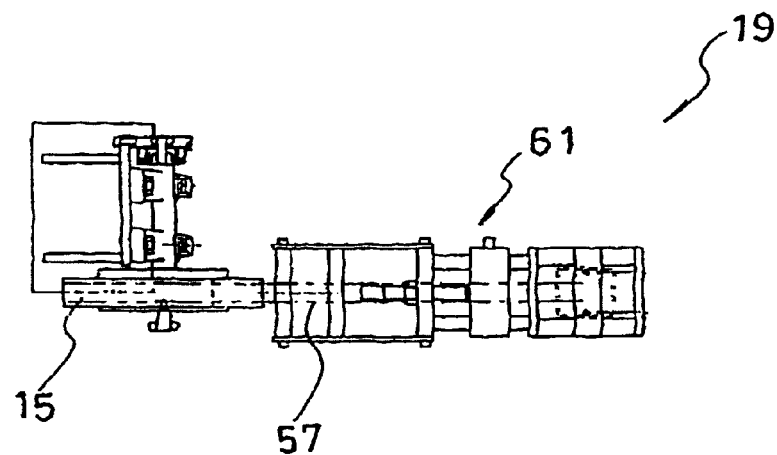
FIGS. 9A and 9B respectively provide a plane view and a front view illustrating a tab feeding unit of an assembling machine as shown in FIG. 3.
Figure 9B:
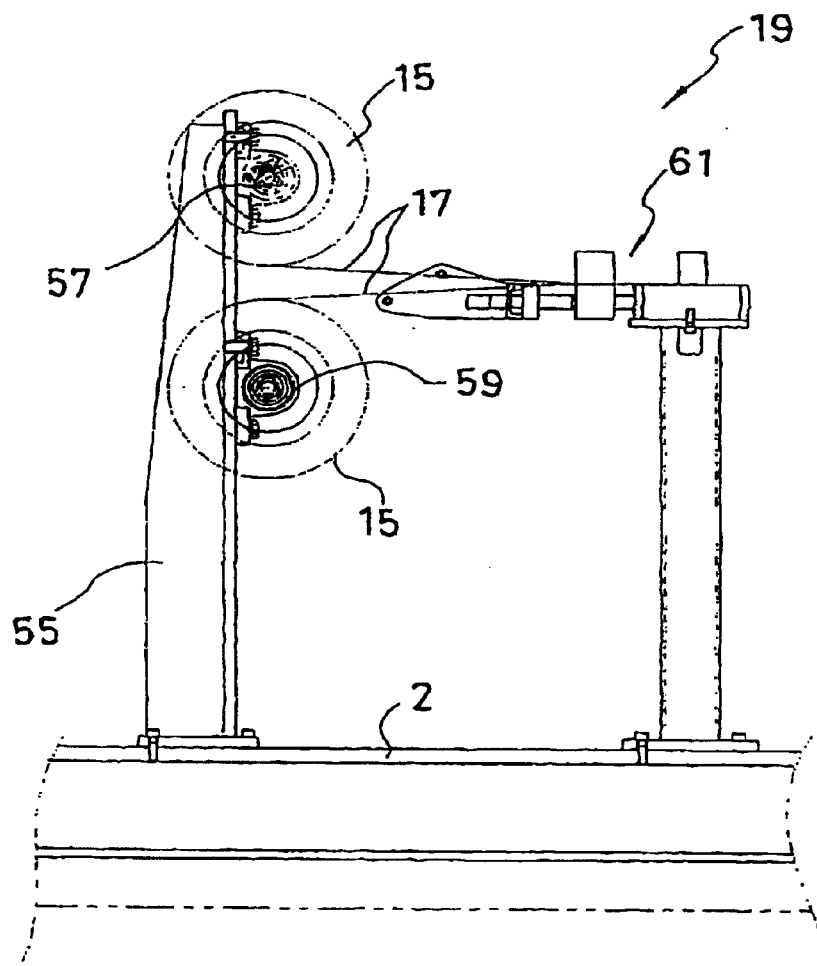

A tab feeding unit 19 as shown in FIGS. 9A and 9B which supplies a tab strip 17 from a tab strip roll 15 to the tact welding unit 25 consists of the tab strip roll 15 coiling the tab strip 17 and a sliding air feeder 61 unwinding the tab strip 17 from the tab strip roll 15. The tab strip roll 15 is disposed for rotation by two upper and bottom shafts 57 and 59 that are disposed at two opposite ends of a column 55 on a base frame 2. The sliding air feeder 61 attached on a column 54 interconnects the tab strip 17 from two opposite ends of the tab strip roll 15 and thus into slide movement toward the tact welding unit 25.

Figure 10A:
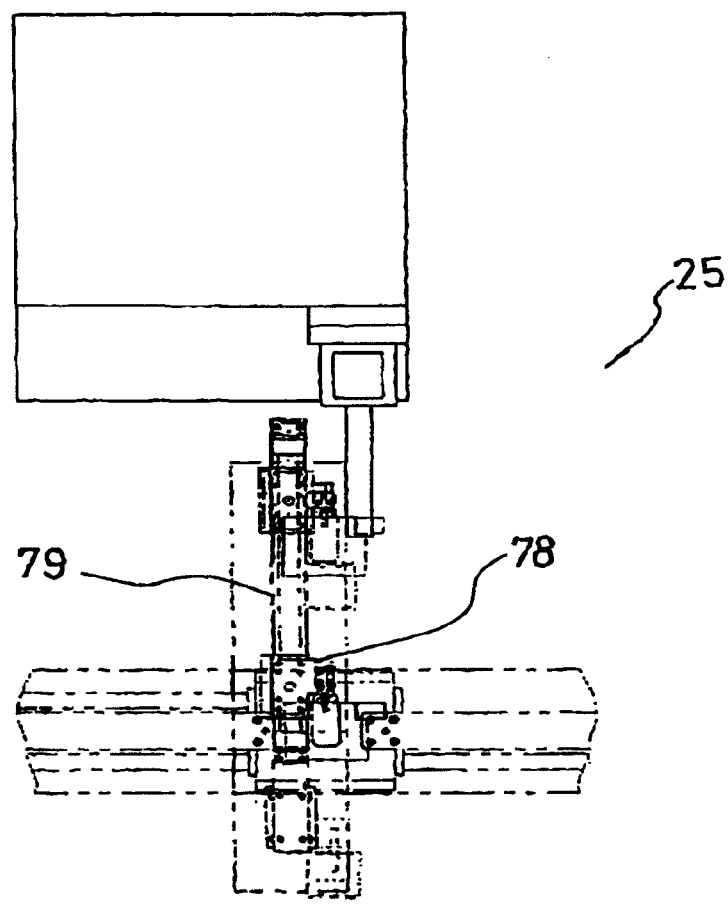
FIGS. 10A to 10C respectively provide a plane view, a front view, and a side view illustrating a tact welding unit of an assembling machine as shown in FIG. 3.
Figure 10B:
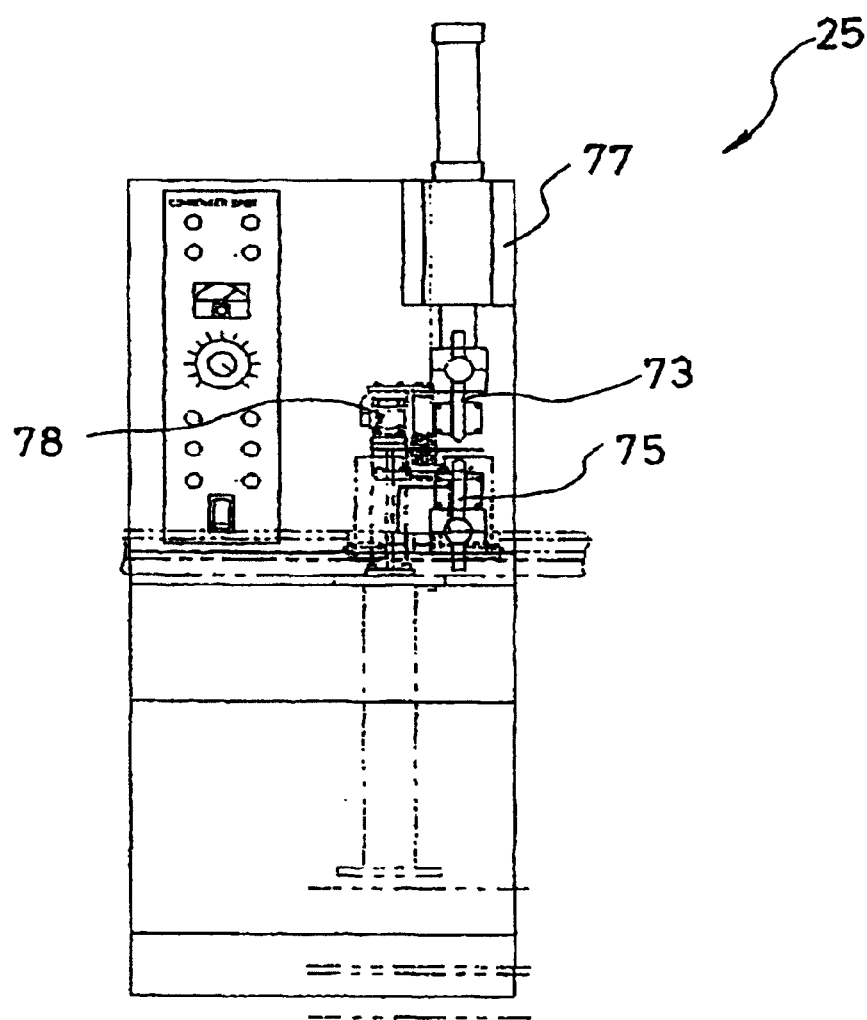
Figure 10C:
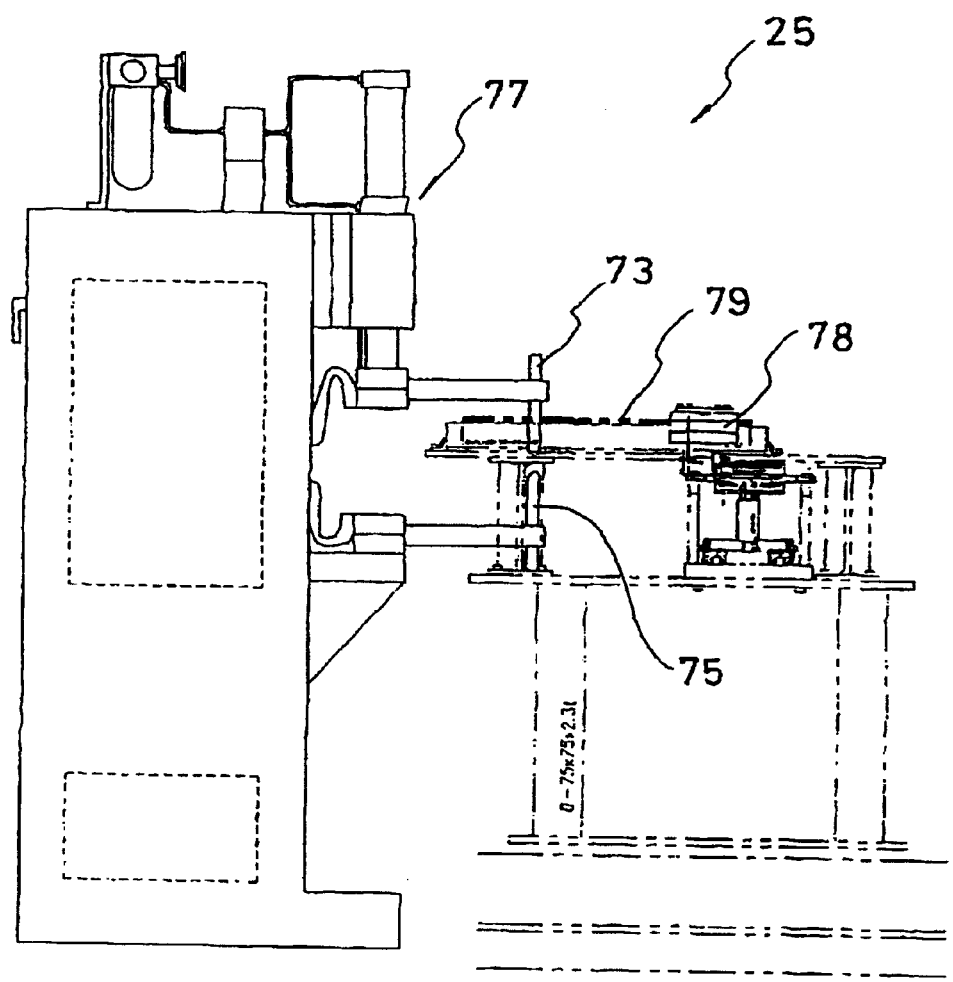
Figure 11A:
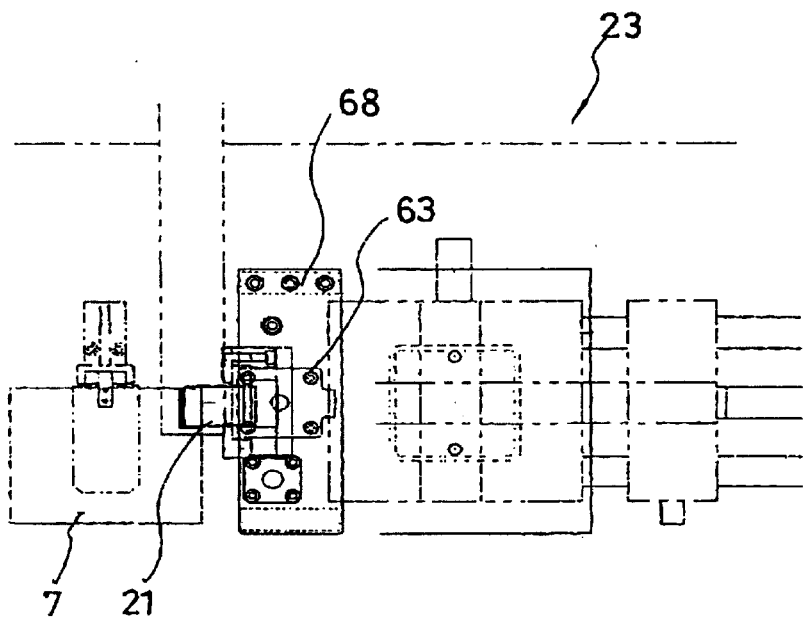
FIGS. 11A to 11D respectively provide a plane view, a front view, a side view, and a partial detailed view illustrating a cutting unit of an assembling machine as shown in FIG. 3.
Figure 11B:
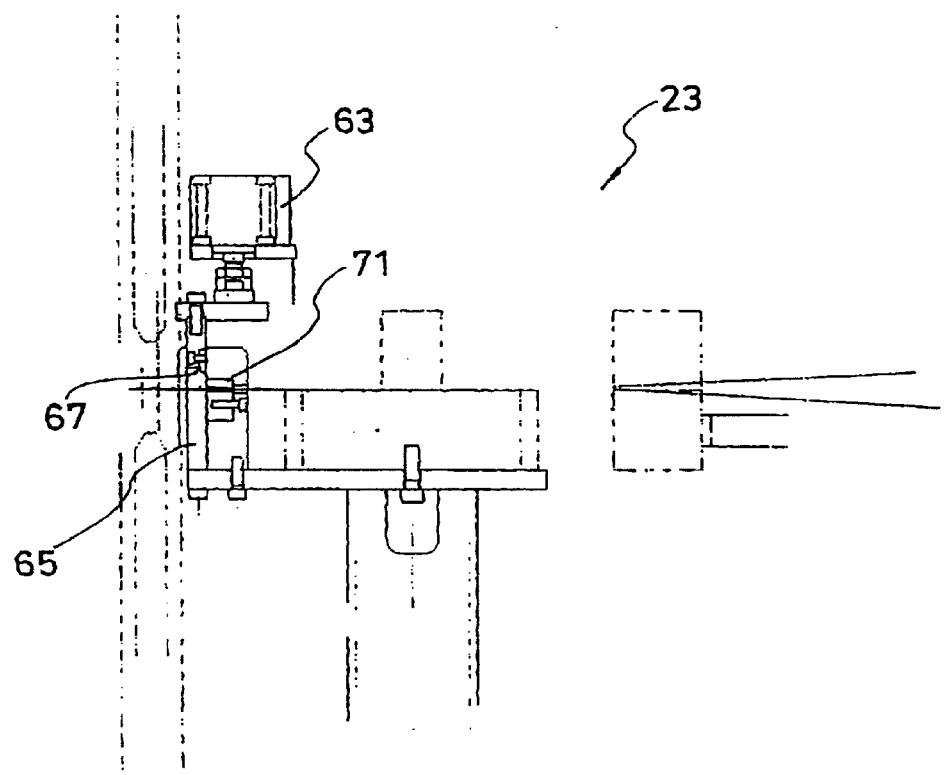
Figure 11C:
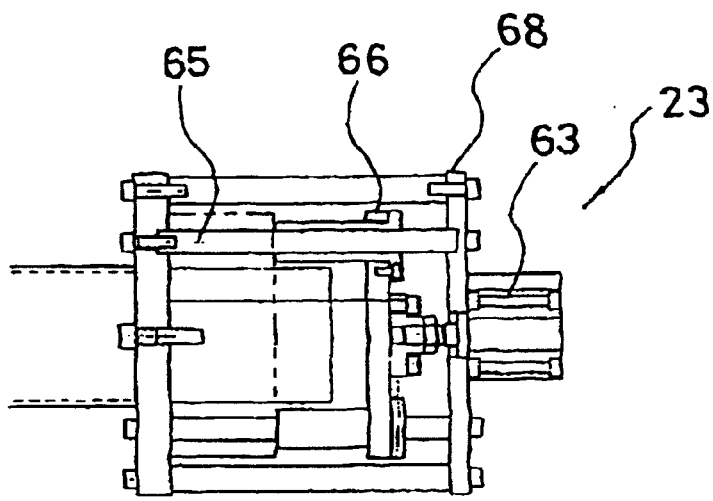
Figure 11D:
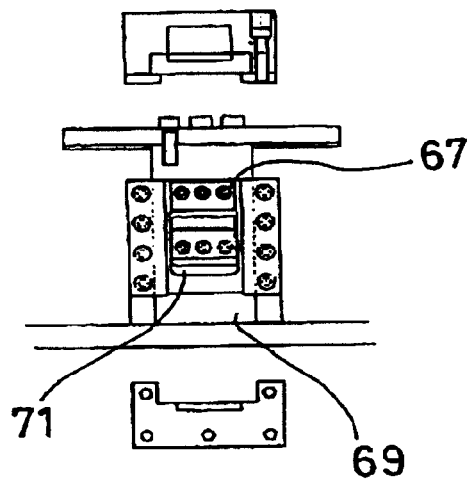

The tact welding unit 25 as shown in FIGS. 10A to 10C is made for temporarily welding the end of the tab strip 17 supplied from the tab feeding unit 19 to two opposite ends of the active material removing portion 11 of the negative electrode plate7. The tact welding unit 25 consists of a tact welding machine 77, a finger holder 81, and a sliding cylinder 79. The tact welding machine 77, a general condenser welding machine, wherein upper and lower welding tips 73 and 75 are disposed at the tact welding position for temporarily welding the tab strip 17 at a point with the folded upper and lower faces of the active material removing portion 11 of the negative electrode plate 7. The finger holder 81 is attached on the sliding cylinder 79 by the hand portion 78 for transferring the negative electrode plate 7 to the temporarily welded area by holding the negative electrode plate 7, that has been moved from the active material removing unit 13 by the under shuttle 33, to the tact welding area. The sliding cylinder 79 is disposed at a right angle with the under shuttle 33 for reciprocating the finger holder 81 toward an axial direction.

The cutting unit 23, for cutting a predetermined length of the tab strip that is temporarily welded at the active material removal area 11 of the negative electrode plate 7, as shown in FIGS. 11A to 11D is disposed next to welding tips 73 and 75 of the tact welding unit 25 at the edge of the tab feeding unit 19 for cutting the temporarily welded tab strip 17, and consists of upper and lower portion cutter blades 67 and 71 and a cylinder 63 reciprocating the upper portion cutter blade 67.

The upper cutting blade 67 cuts the temporarily welded tab strip 17 while the same is attached to a lower plate 66 reciprocating along the guide post 65. The cylinder 63 disposed on an upper plate 68 moves the lower plate 66. A lower cutting blade 71 is fixed at a slide 69 from the bottom of the opposite side of the blade 67.

Figure 12A:
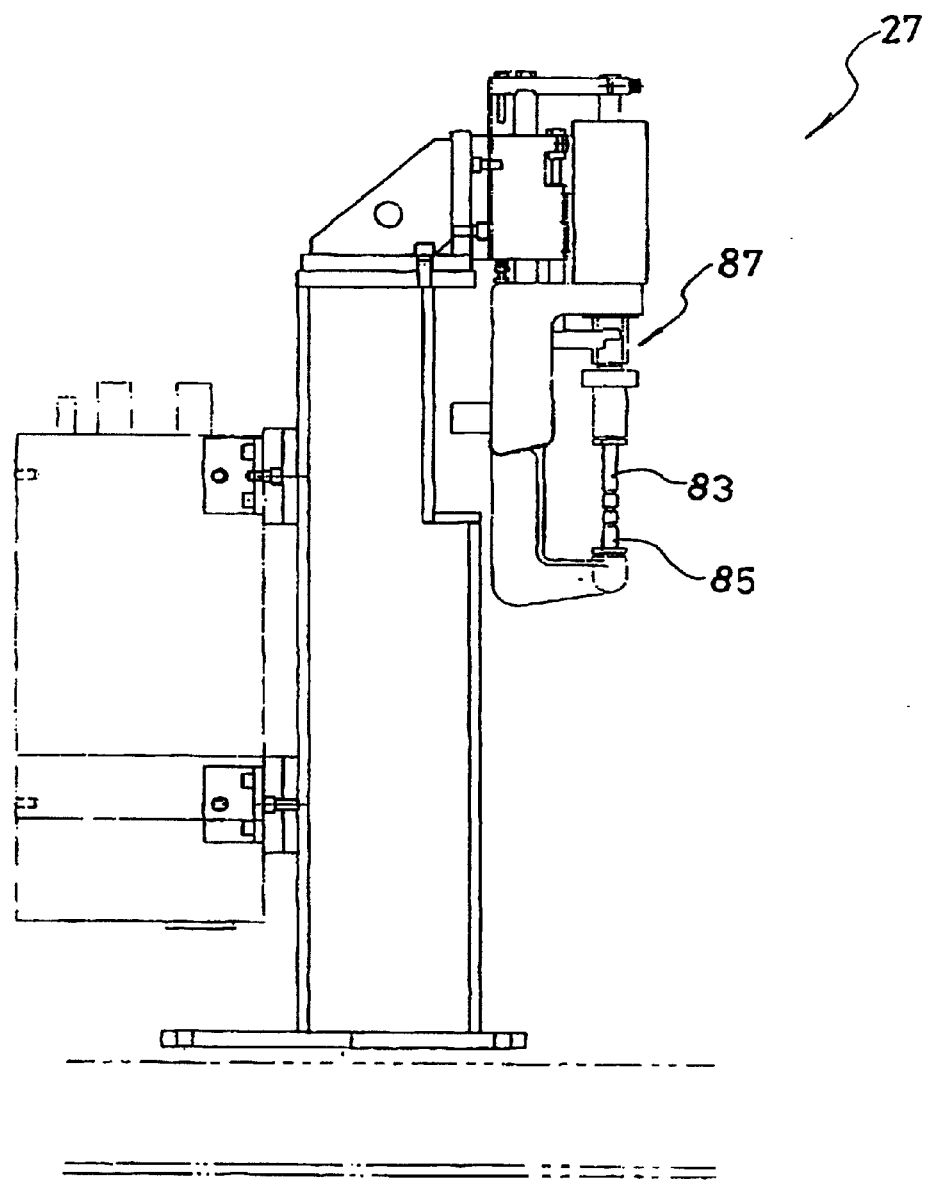
FIGS. 12A and 12B respectively provide a side view and a front view illustrating a finish welding unit of an assembling machine as shown in FIG. 3.
Figure 12B:
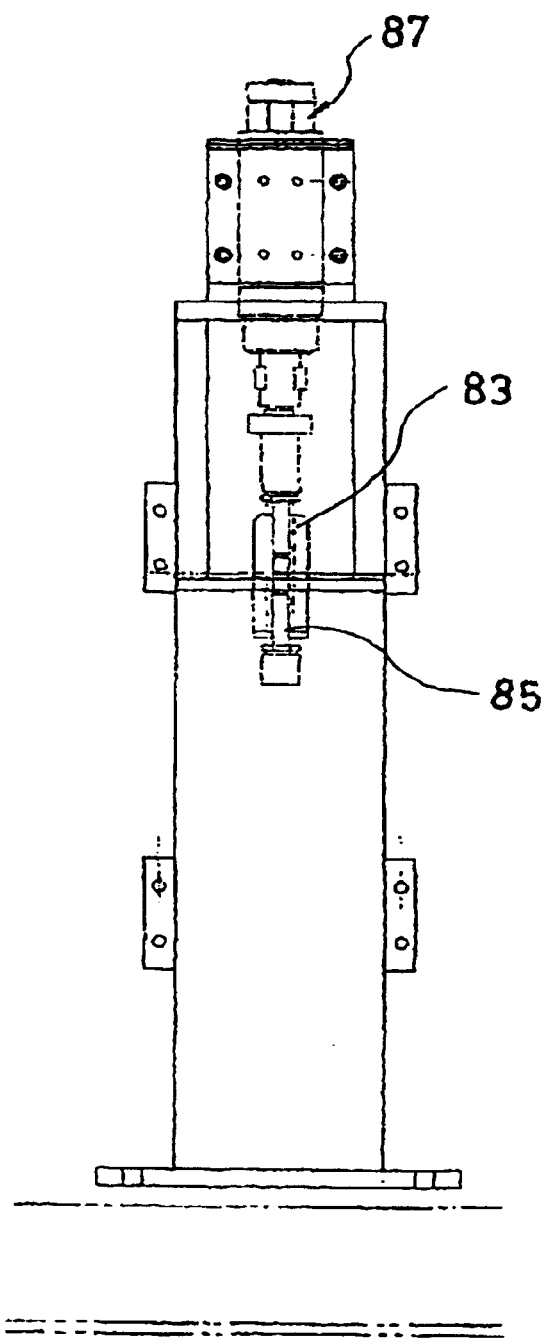
Figure 13A:
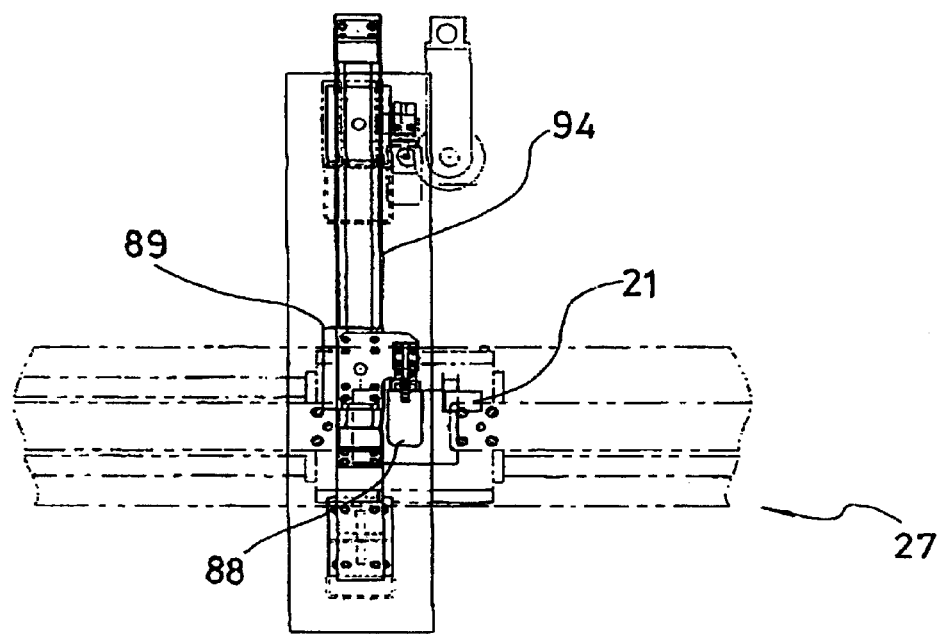
FIGS. 13A and 13B respectively provide a plane view and a side view illustrating a moving portion of a finish welding unit of an assembling machine as shown in FIG. 3.
Figure 13B:
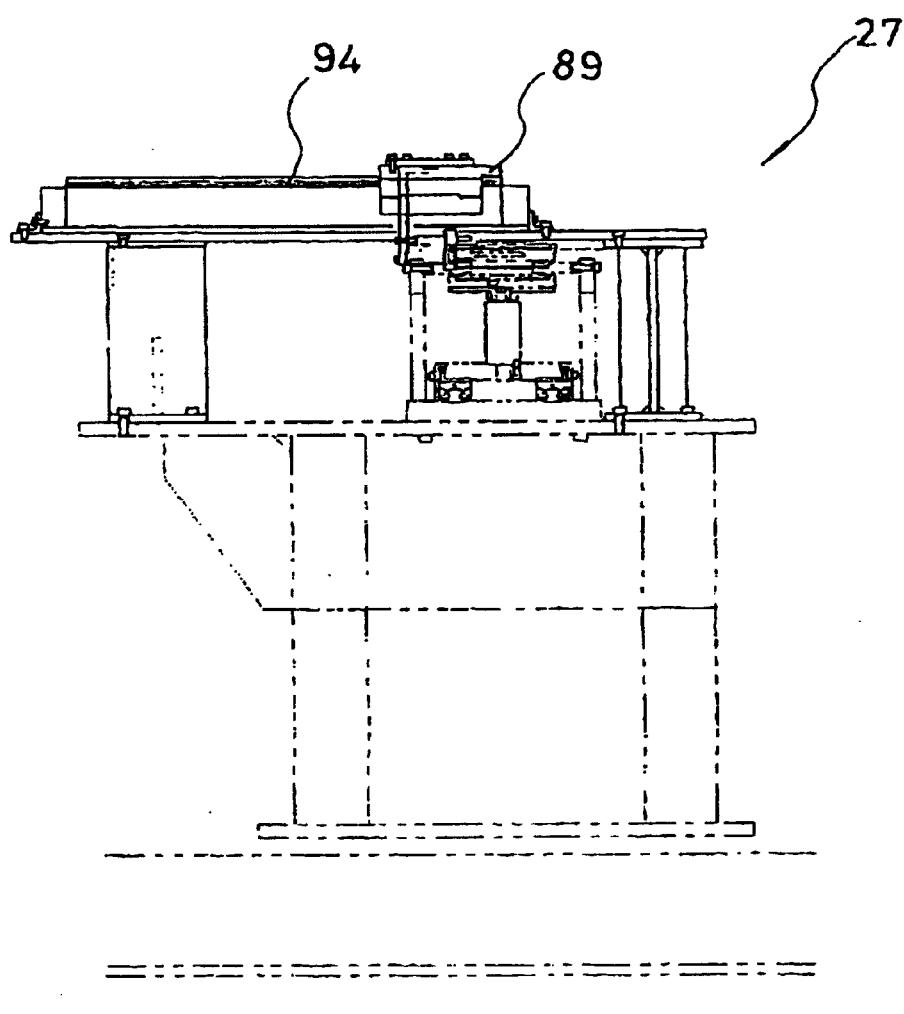

The finish welding unit 27 for completely welding a temporarily welded tab 21 as shown in FIGS. 12A to 12C consists of a general DC welding machine 87, finger portion as shown in FIGS. 13A and 13B, and a single robot 89. The finish welding machine 87 having welding tips 83 and 85 that are disposed at upper and lower positions of the finish welding area as shown in FIGS. 12A and 12B, can multi-weld upper and lower faces of the overlapped areas of the tab 21 of the negative electrode plate 7. The finger portion 88 is attached to a body of the single robot 89 as shown in FIGS. 13A and 13B for holding the negative electrode plate 7 that is transferred from the tact welding unit 25 by the under-shuttle 33 and loading the negative electrode plate 7 into the finish welding area. The single robot 89 is made for being reciprocated along a rail 94 that is disposed at a right angle with the under-shuttle 33 for reciprocating the finger portion 88 in an axial direction.

Figure 14A:
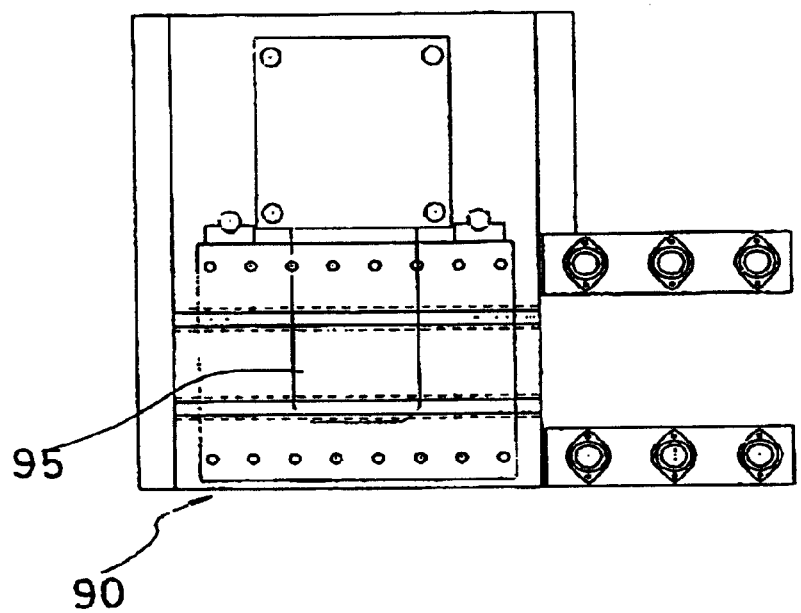
FIGS. 14A to 14C respectively provide a plane view, a front view, and a side view illustrating a pressing portion of a second blanking press unit of an assembling machine as shown in FIG. 3.
Figure 14B:
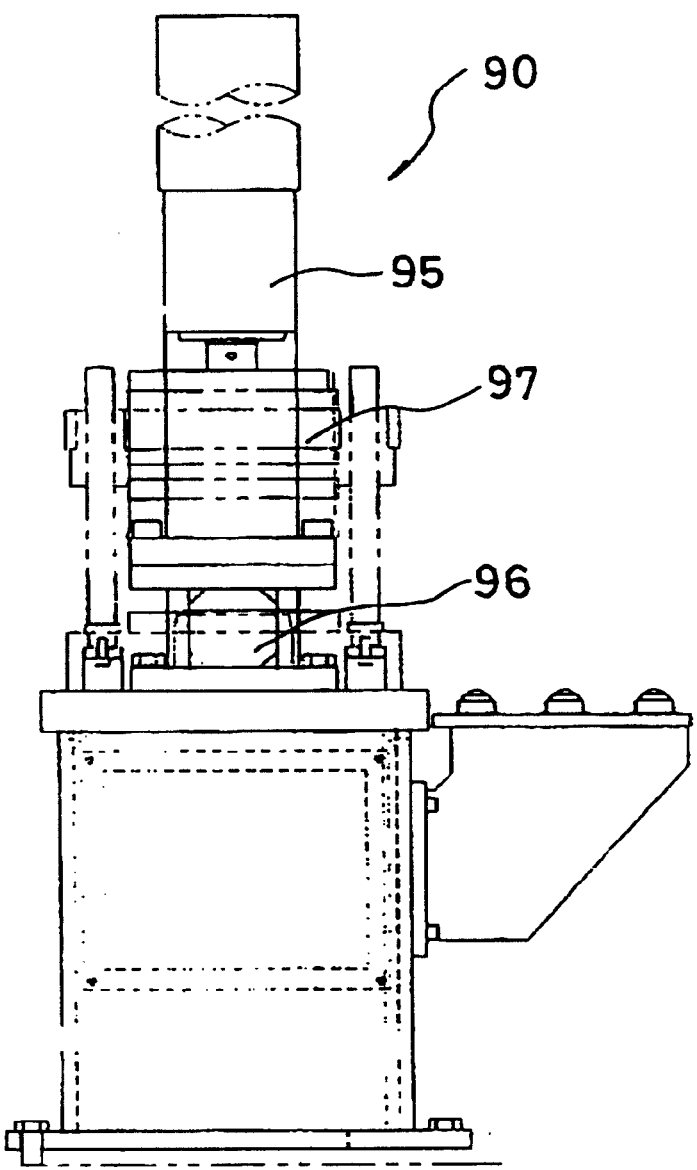
Figure 14C:
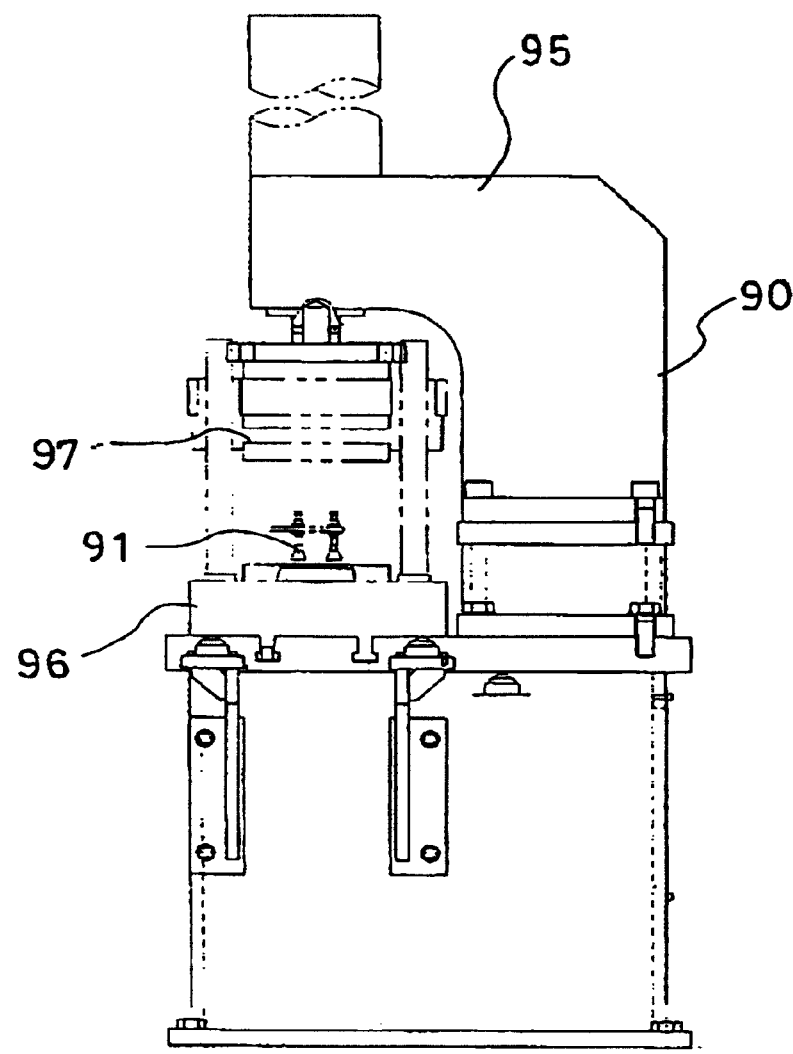

The second blanking press unit 31 as shown in FIGS. 14A to 14C and 15A and 15B consists of a suction pad 91, a moving cylinder 93, and a blanking press 90 for finally cutting with a desired shape 29 the negative electrode plate 7 that is fully welded with the tab 21. The blanking press 90 as shown in FIGS. 14A to 14C consists of a main body 95 of the press for developing a blanking force, a mold base 96 having an opening of a desired shape and forming a lower portion of the press, and a blanking punch forming an upper portion of the press and disposed above the mold base 96 for the desired configuration.

Figure 15A:
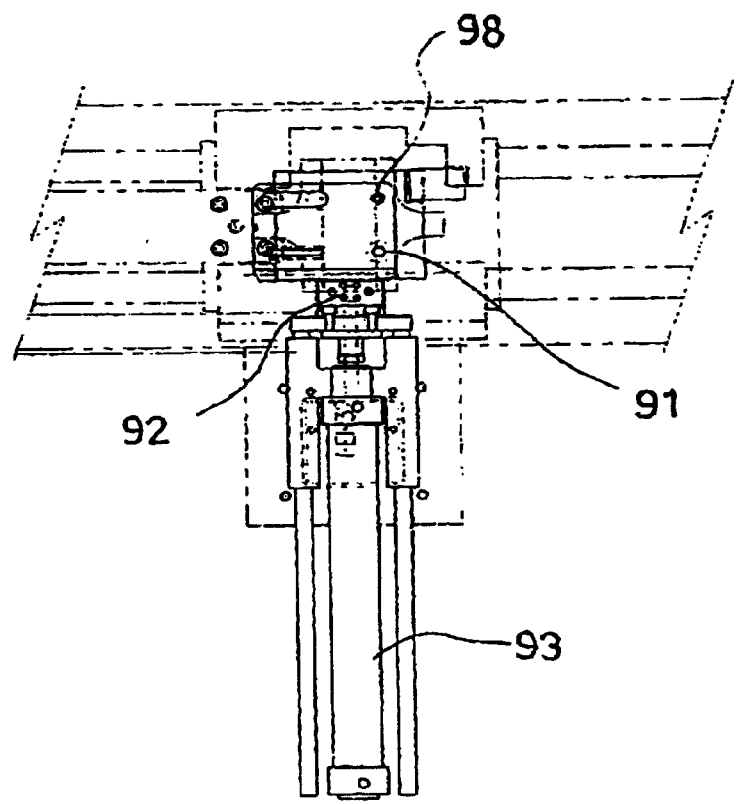
FIGS. 15A and 15B respectively provide a plane view and a side view illustrating a moving portion of a second blanking press unit of an assembling machine as shown in FIG. 3.
Figure 15B:
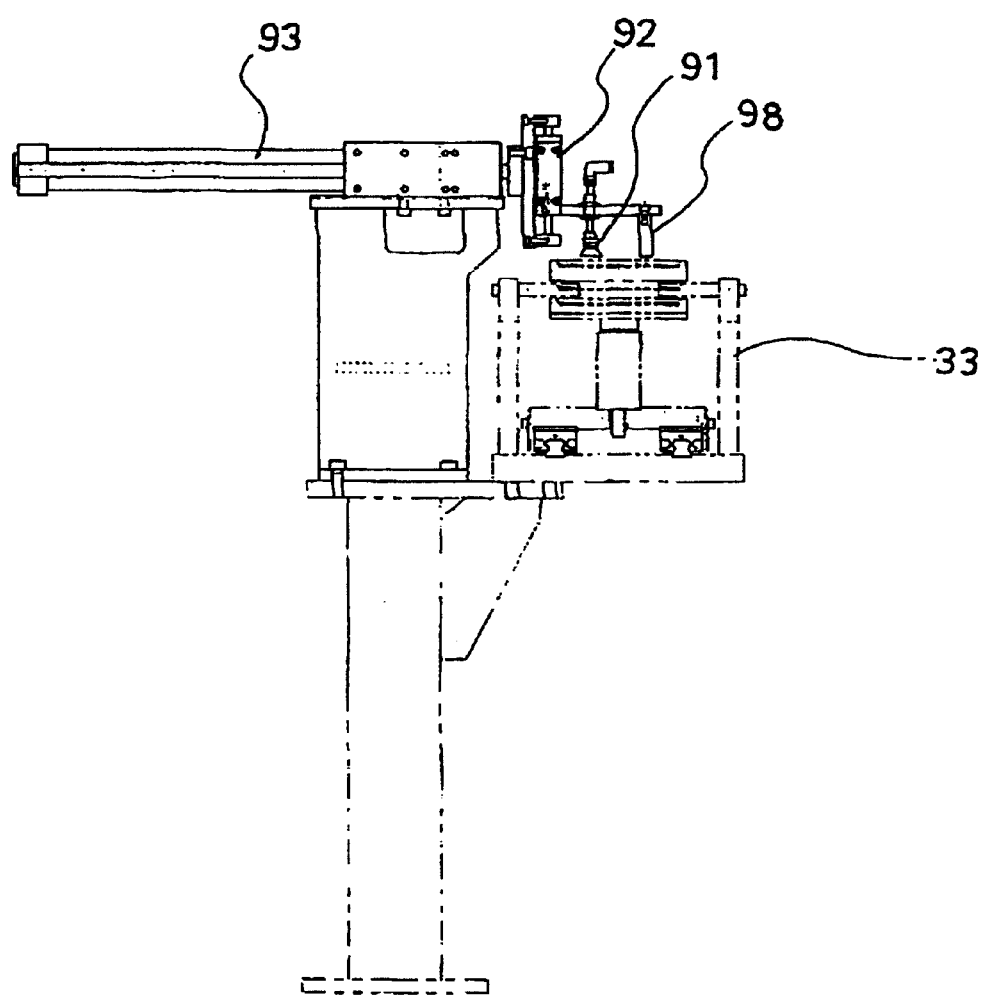

The suction pad 91 that transfers the negative electrode plate 7 with the transferred tab 21 through the under-shuttle 33 to second blanking position is attached to the bottom of the pad bracket 92, being above the under-shuttle 33 as shown in FIGS. 15A and 15B. A pad guide 98 is attached near the pad 91 for supporting the negative electrode plate 7 held by the suction pad 91. The moving cylinder 93 is disposed in a right angle direction of the under-shuttle 33 for transferring a pad bracket 92 with the suction pad 91 to the second blanking position.

According to the above assembling machine for the negative electrode plate as shown in FIG. 2, the negative electrode plate is assembled through a series of processes as follows.

The source material of the negative electrode plate 6 is uncoiled from the electrode plate roll 5 of the electrode plate feeding unit 3 by the sliding air feeder 37 as shown in FIG. 5 and is supplied to the first blanking press unit 9 (S1).

The source material of the electrode plate 6 supplied to the first blanking press unit 9 is positioned on the mold base 12 as shown in FIG. 6 and then forms the rectangular negative electrode plate unit 7 that is cut with a predetermined length by the blanking punch 14 (S2).

The negative electrode plate 7 blanked at first blanking stage (S2) is transferred to the active material removing unit 13 by the under shuttle 33 as shown in FIG. 7. The transferred negative electrode plate 7 is held as the hand portion 39 moves forward by the twin cylinder 43, and the hand portion 39 then rotates 90 degrees upward by the rotational force of the rotary cylinder 45 so the held negative electrode plate 7 is loaded to the active material removing position. When the negative electrode plate 7 is fixed by operating the twin cylinder 51 as shown in FIG. 8 and the vibration hammer 47 is positioned at the active material removing position by the linear motor 49, the active material coated thereat can be removed by striking the active material removal area 11 of the negative electrode plate 7 (S3).

At the tab feeding unit 19 as shown in FIG. 9 two tab strips 17 are unwound from upper and lower tab strip rolls 15 by the sliding air feeder 37 and are then supplied to the tact welding unit 25 through the cutting unit 23 (S4).

When edges thereof are respectively folded at upper and lower faces of the active material removal area 11 of the negative electrode plate 7 that is loaded to the tact welding position by the under shuttle 33, two tab strips 17 supplied to the tact welding unit 25 are temporarily welded at a point by upper and lower welding tips 73 and 75 of the tact welding unit as shown in FIG. 10 (S5).

After tact welding, a rectangular tab 21 is formed by cutting edges of upper and lower tab strips 17 that are temporarily welded at upper and lower faces of the active material removal area 11 of the negative electrode plate 7, with a predetermined length by upper and lower cutter blades 67 and 71 of the cutting unit 23 (S6).

The negative electrode plate 7 wherein the tact welding of the tab 21 is completely is again transferred to the finish welding unit 27 as shown in FIG. 12 by the under-shuttle 33. When the negative electrode plate 7 is transferred to the finish welding unit 27, the single robot 89 as shown in FIG. 13 moves to the under-shuttle along a rail 94 and loads the negative electrode plate 7 into the finish welding position by holding the negative electrode plate 7 at the undershuttle 33 by the finger portion 88. The tab 21 of the temporarily welded negative electrode plate 7 is fully multi-welded by the welding tips 83 and 85 of the finish welding machine as shown in FIG. 12 (S7).

After the finish welding is completed, the negative electrode plate 7 is transferred to a second blanking press unit 31 by the under-shuttle 33 and held by the suction pad 91 as shown in FIGS. 15A and 15B, and is loaded into the second blanking position of the main body 95 of the press of the second blanking press 90 as shown in FIG. 14 by the moving cylinder 93. The negative electrode plate 7 is finally cut in a desired shape 29 by a mold base 96 that has a desired shape of opening and a blanking punch 97 having the same shape as the opening of the mold base 96 (S8).

According to the assembling machine for the negative electrode plate and assembly process thereof, the negative electrode plate for Ni-MH batteries can be continuously made through an automated on-line production process so that working steps and production time for the manufacture thereof can be substantially reduced. This results in the reduction of cost and reject rate for the production of negative electrode plates.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An assembling machine for a negative electrode plate for nickel metal hydroxide batteries comprising:

an electrode plate feeding unit supplying a source material of the negative electrode plate from an electrode plate roll;

a blanking press unit forming a rectangular negative electrode plate unit by cutting the source material of the negative electrode plate with a predetermined length;

an active material removing unit removing an active material forming a surface of the negative electrode plate by striking an active material removal area of the negative electrode plate, wherein the active material removing unit comprises a holding portion having a finger portion for holding the negative electrode plate, a twin cylinder connected to the finger portion through an upper hand portion for sliding the finger portion in an axial direction, and a rotary cylinder rotating the finger portion in a right angle and a negative electrode plate striking portion having a vibration hammer that reciprocates by a linear motor for striking the active material removal area of the loaded negative electrode plate that is lifted to a striking position by the rotation of the finger portion and a stopper for holding an opposite side of the above active material removal area;

a tab feeding unit supplying a tab strip from a tab strip roll;

a tact welding unit that temporarily welds the edge of the tab strip transferred from the tab feeding unit to upper and lower faces of an active material removal area of the negative electrode plate;

a cutting unit forming a rectangular tab by cutting with a predetermined length the tab strip that is temporarily welded to the active material removal area of the negative electrode plate;

a finish welding unit that fully welds the temporarily welded tab; and a second blanking press unit that finally cuts with a desired shape the negative electrode plate that is fully welded to the tab.

2. The assembling machine for the negative electrode plate for nickel metal hydroxide batteries according to claim 1, wherein each of the said units transfers the negative electrode plate between each unit by a series of under-shuttles.

3. The assembling machine for the negative electrode plate for nickel metal hydroxide batteries according to claim 2, wherein an under-shuttle of said series of under-shuttles comprises a base plate enclosing a base, a slide plate moving between each unit, a fixed seat attached above the slide plate for locating the negative electrode plate, a moving seat that moves toward the two opposite ends of the slide plate through an opening at a center portion of the fixed seat, and a guide cylinder causing a reciprocation of the moving seat.

4. The assembling machine for the negative electrode plate for nickel metal hydroxide batteries according to claim 1, wherein the electrode plate feeding unit comprises the electrode plate roll for rotation on a shaft and a sliding air feeder unwinding the source material of the negative electrode plate from the electrode plate roll.

5. The assembling machine for the negative electrode plate for nickel metal hydroxide batteries according to claim 1, wherein the tab feeding unit comprises two tab strip rolls disposed for rotation at upper and lower shafts that are attached at two opposite ends of a column, and a sliding air feeder sliding with the tab strip for unwinding the tab strips from the tab strip rolls.

6. The assembling machine for the negative electrode plate for nickel metal hydroxide batteries according to claim 1, wherein the cutting unit comprises an upper cutting blade disposed on a lower plate reciprocating along a guide post, a cylinder that is disposed at the upper plate reciprocating the lower plate, and a lower cutting blade fixed at a slide from the bottom of the opposite side of the upper cutting blade.

7. The assembling machine for the negative electrode plate for nickel metal hydroxide batteries according to claim 1, wherein the tact welding unit comprises a welting machine having upper and lower tips that are disposed at upper and lower active material removal areas of the negative electrode plate that is loaded in a tact welding position, a finger portion holding and loading the negative electrode plate to the tact welding position, and a sliding cylinder disposed at a right angle with the under-shuttle for reciprocating the finger portion in an axial direction.

8. The assembling machine for the negative electrode plate for nickel metal hydroxide batteries according to claim 1, wherein the finish welding unit comprises a welding machine having upper and lower tips disposed at upper and lower tab overlapped areas of the negative electrode plate that is loaded at a finish welding position, a finger portion holding and loading the negative electrode plate at the finish welding position, and a single robot disposed at a right angle with the under-shuttle for reciprocation the finger portion in an axial direction.

9. The assembling machine for the negative electrode plate for nickel metal hydroxide batteries according to claim 1, wherein the second blanking press unit comprises a press that finally cuts with the desired shape the negative electrode plate transferred to a blanking position, a suction pad transferring the negative electrode plate to the blanking position by holding, and a moving cylinder that reciprocates a pad bracket with the suction pad in a right angle direction.

10. An assembling machine for a negative electrode plate for nickel metal hydroxide batteries comprising:

an electrode plate feeding unit supplying a source material of the negative electrode plate from an electrode plate roll;

a blanking press unit forming a rectangular negative electrode plate unit by cutting the source material of the negative electrode plate with a predetermined length;

an active material removing unit removing an active material forming a surface of the negative electrode plate by striking an active material removal area of the negative electrode plate;

a tab feeding unit supplying a tab strip from a tab strip roll, wherein the tab feeding unit comprises two tab strip rolls disposed for rotation at upper and lower shafts that are attached at two opposite ends of a column, and a sliding air feeder sliding with the tab strip for unwinding the tab strips from the tab strip rolls;

a tact welding unit that temporarily welds the edge of the tab strip transferred from the tab feeding unit to upper and lower faces of an active material removal area of the negative electrode plate;

a cutting unit forming a rectangular tab by cutting with a predetermined length the tab strip that is temporarily welded to the active material removal area of the negative electrode plate;

a finish welding unit that fully welds the temporarily welded tab; and a second blanking press unit that finally cuts with a desired shape the negative electrode plate that is fully welded to the tab.

11. An assembling machine for a negative electrode plate for nickel metal hydroxide batteries comprising:

an electrode plate feeding unit supplying a source material of the negative electrode plate from an electrode plate roll;

a blanking press unit forming a rectangular negative electrode plate unit by cutting the source material of the negative electrode plate with a predetermined length;

an active material removing unit removing an active material forming a surface of the negative electrode plate by striking an active material removal area of the negative electrode plate;

a tab feeding unit supplying a tab strip from a tab strip roll;

a tact welding unit that temporarily welds the edge of the tab strip transferred from the tab feeding unit to upper and lower faces of an active material removal area of the negative electrode plate, wherein the tact welding unit comprises a welding machine having upper and lower tips that are disposed at upper and lower active material removal areas of the negative electrode plate that is loaded in a tact welding position, a finger portion holding and loading the negative electrode plate to the tact welding position, and a sliding cylinder disposed at a right angle with the under-shuttle for reciprocating the finger portion in an axial direction;

a cutting unit forming a rectangular tab by cutting with a predetermined length the tab strip that is temporarily welded to the active material removal area of the negative electrode plate;

a finish welding unit that fully welds the temporarily welded tab; and a second blanking press unit that finally cuts with a desired shape the negative electrode plate that is fully welded to the tab.

12. An assembling machine for a negative electrode plate for nickel metal hydroxide batteries comprising:

an electrode plate feeding unit supplying a source material of the negative electrode plate from an electrode plate roll;

a blanking press unit forming a rectangular negative electrode plate unit by cutting the source material of the negative electrode plate with a predetermined length;

an active material removing unit removing an active material forming a surface of the negative electrode plate by striking an active material removal area of the negative electrode plate;

a tab feeding unit supplying a tab strip from a tab strip roll;

a tack welding unit that temporarily welds the edge of the tab strip transferred from the tab feeding unit to upper and lower faces of an active material removal area of the negative electrode plate;

a cutting unit forming a rectangular tab by cutting with a predetermined length the tab strip that is temporarily welded to the active material removal area of the negative electrode plate;

a finish welding unit that fully welds the temporarily welded tab, wherein the finish welding unit comprises a welding machine having upper and lower tips disposed at upper and lower tab overlapped areas of the negative electrode plate that is loaded at a finish welding position, a finger portion holding and loading the negative electrode plate at the finish welding position, and a single robot disposed at a right angle with the under-shuttle for reciprocation the finger portion in an axial direction; and a second blanking press unit that finally cuts with a desired shape the negative electrode plate that is fully welded to the tab.

* * * * *

UNITED STATES PATENT AND TRADEMARK OFFICE
CERTIFICATE OF CORRECTION

PATENT NO. : 6,327,774 B1  Page 1 of 1
DATED : December 11, 2001
INVENTOR(S) : San Cheon et al.

It is certified that error appears in the above-identified patent and that said Letters Patent is hereby corrected as shown below:

Column 8,
Line 21, replace "welting" with -- welding --.
Line 37, replace "reciprocation" with -- reciprocating --.

Column 10,
Line 37, replace "reciprocation" with -- reciprocating --.

Signed and Sealed this

Eighth Day of July, 2003

JAMES E. ROGAN
*Director of the United States Patent and Trademark Office*